(12) United States Patent
Shintani

(10) Patent No.: US 7,380,263 B2
(45) Date of Patent: May 27, 2008

(54) APPARATUS AND METHOD FOR USE IN TELEVISION CHANNEL MAPPING

(75) Inventor: Peter Rae Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 116 days.

(21) Appl. No.: 10/688,338

(22) Filed: Oct. 17, 2003

(65) Prior Publication Data
US 2005/0086693 A1    Apr. 21, 2005

(51) Int. Cl.
| | |
|---|---|
| H04N 5/50 | (2006.01) |
| H04N 5/445 | (2006.01) |
| H04N 7/173 | (2006.01) |
| H04N 7/16 | (2006.01) |

(52) U.S. Cl. .................. 725/59; 725/131; 725/139; 725/159; 348/732

(58) Field of Classification Search ............... 725/139, 725/131, 151, 59, 80; 348/732, 731
See application file for complete search history.

(56) References Cited

U.S. PATENT DOCUMENTS

| | | | |
|---|---|---|---|
| 4,660,170 A | | 4/1987 | Hui et al. |
| 5,477,262 A | | 12/1995 | Banker et al. |
| 6,072,535 A | | 6/2000 | Kearns |
| 6,137,546 A | * | 10/2000 | Shintani et al. ............ 348/731 |
| 6,456,338 B1 | | 9/2002 | Yuen |
| 6,775,843 B1 | * | 8/2004 | McDermott ................ 725/151 |
| 2003/0056216 A1 | | 3/2003 | Wugofski |
| 2004/0036811 A1 | * | 2/2004 | Ikeguchi ..................... 725/38 |

FOREIGN PATENT DOCUMENTS

| | | |
|---|---|---|
| JP | 9130689 A2 | 5/1997 |
| JP | 9154113 A2 | 6/1997 |
| JP | 2001-136443 | 5/2001 |
| WO | WO 99/35841 | 7/1999 |
| WO | WO 99/35843 A1 | 7/1999 |
| WO | WO 00/78039 A1 | 12/2000 |
| WO | WO 01/06771 A1 | 1/2001 |

OTHER PUBLICATIONS

Johnson, Method and Apparatus for Performing a Channel Search in a Television, WO 01/06771.*
PCT International Search Report and Written Opinion of the International Searching Authority, Apr. 24, 2006, PCT/US04/034136.

* cited by examiner

Primary Examiner—Hunter B. Lonsberry
(74) Attorney, Agent, or Firm—Fitch, Even, Tabin & Flannery

(57) ABSTRACT

A method, apparatus, and system are provided for use in performing a limited channel mapping. In some embodiments a method can select an input of a plurality of inputs, select a single modulation scheme of a plurality modulation schemes delivered through the selected input, tune in a plurality of channels for the single modulation scheme, determine if a broadcast is received on each of the channels, record channels that are determined to receive broadcasts in a channel map, and not performing a full auto-program. Some embodiments further scan a signal associated with the first modulation scheme, identify channels carrying broadcast information, comparing previously defined channel assignments of the channel map with the identified channels during the scan, and initiate the tuning, the determining and the recording when a difference is detected when comparing the channel assignments.

19 Claims, 7 Drawing Sheets

APPARATUS AND METHOD FOR USE IN TELEVISION CHANNEL MAPPING

FIELD OF THE INVENTION

The present invention relates generally to generating television channel lists and/or mapping, and more particularly to generating and/or updating one or more television channel maps in an efficient manner.

BACKGROUND OF THE INVENTION

Many televisions have the capability of running an auto-program that searches received signals to identify channels on which broadcast information is delivered. Identified channels are recorded into a channel map. The channel map allows a television to limit the channels that the television automatically accesses so that a user does not have to pass through those channels that do not have broadcast information.

Identifying whether a channel does or does not carry broadcast information can take a second or two per channel. Further, televisions that perform auto-programs generally require a full auto-program to be run where all of the potentially available channels for all available signals are evaluated. Evaluating each available channel can take a significant amount of time. Additionally, while the television is performing an auto-program a user is typically unable to watch any of the channels.

As the number of available channels continues to increase, the running of an auto-program can take prohibitively excessive amounts of time. Further, some channels, such as channels received over digital terrestrial signals, can be more difficult and/or time consuming to acquire, resulting in still longer auto-programs. Additionally, it is common for television signal providers (e.g., cable providers, terrestrial signal providers and other signal providers) to reallocate channel assignments.

In many instances the reallocation of channels by the provider is transparent to the user because the provider supplies the channel allocation changes to provider's set-top-box. Televisions that do not use set-to-boxes, however, cannot utilize the proprietary information and thus the channel reallocation can be very confusing and frustrating to a user. As a result, it can be beneficial to perform an auto-program at frequent intervals. Because televisions generally require that a full auto-program be run searching all available channels on all available signals from all available input, the time to perform the auto-program is extensive. Thus, users are inhibited from performing auto-programming, and as such fail to maintain current channel mapping.

SUMMARY OF THE INVENTION

The present invention advantageously addresses the needs above as well as other needs through the provision of the methods and apparatuses for use in generating television channel lists and/or maps. In some embodiments, a method for use in generating a television channel map can select a first input of a plurality of inputs, select a first single modulation scheme of a plurality modulation schemes on the first input, tune in a plurality of channels for the identified single modulation scheme, determine if a broadcast is received on each of the channels, record channels that are determined to receive broadcasts in a channel map according to the plurality of tuned channels for the identified single modulation scheme, and not perform a full auto-program. Some embodiments further scan a signal modulated by the first modulation scheme, identify channels carrying broadcast information, compare previously defined channel assignments of the channel map with the identified channels during the scan, and initiate the tuning, the determining and the recording when a difference is detected while comparing the channel assignments.

Some embodiments provide a method for use in generating channel maps. The method can include selecting a signal of a plurality of signal to evaluate, generating a channel map for the signal and limiting the channel map to the signal and not performing a full auto-program. The generating of the channel map for the signal can further include tuning in the signal, tuning in each of a plurality of channels carried by the signal, and recording into the channel map each of a plurality of channels that deliver broadcast information. The limiting of the generation of the channel map can further comprises limiting the channel map to the signal and not generating channel mapping for any other signals of the plurality of signals. Some embodiments further determine if a signal quality meets a predefined threshold for each of the plurality of channels that deliver broadcast information prior to recording, wherein the recording includes recording each of the plurality of channels that have a signal quality that meet the predefined threshold into the channel map.

Additional embodiments provide for an apparatus for use in generating a channel map that can include a plurality of inputs that each receive at least one signal, a selecting device coupled with each of the plurality of inputs, where the selecting device selects a first signal from one of the plurality of inputs, a tuner coupled with the selecting device, where the tuner receives and tunes in the selected first signal, a processor coupled with the tuner, where the processor receives the first signal and performs a channel mapping of the first signal while limiting the channel mapping to the first signal and not completing a full channel mapping of the other signals received through the plurality of inputs. The apparatus can further include a plurality of tuners coupled with the selecting device, each tuner tuning at least one of the plurality of signals.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
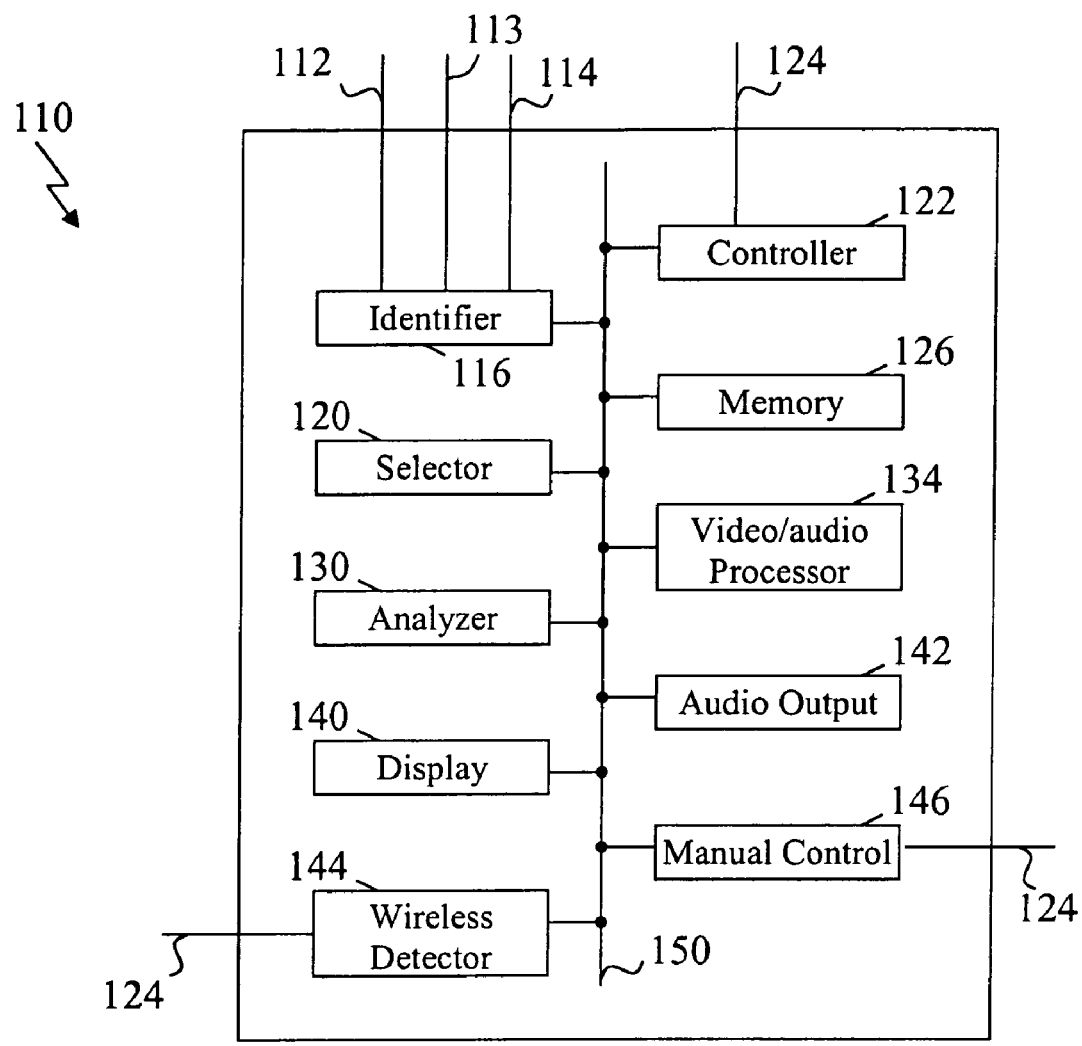
FIG. 1 depicts a simplified block diagram of an apparatus for use in generating and/or updating a channel map according to some embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

These various embodiments provide systems, apparatuses and methods for use in generating, updating and maintaining one or more television channel maps or lists for a plurality of received television signals and channels accessible over those signals. Some televisions include a plurality of inputs, and in some embodiments, can receive one or more television signals over each of the plurality of inputs. The present embodiments provide an auto-program that can generate and/or update a channel map in less time. Further, the present embodiments provide a limited auto-program that can generate and/or update a channel map for a single input and/or a single signal on an input. Providing a limited auto-program significantly reduces the time to generate and maintain accurate and current channel maps.

Some embodiments further provide for a channel scan that verifies the accuracy of a channel mapping. This channel scan can further be performed while the television is not in use. As such, the channel scan can be implemented so that it does not interfere with the use of the television. Further, the channel scan can activate a full auto-program, an auto-program for a single input and/or an auto-program for a single signal. Additionally, the channel scan can activate the full, single input, and/or single signal auto-programs while the television is not in use. This maintains an accurate channel mapping without interfering with the use of the television and without causing a user to have to wait long periods of time for a full auto-program to be run.

Still further, by limiting an auto-program to a single signal, some embodiments can conduct the auto-program more frequently on those signals that are more likely to have changes, and less frequently on those signals that are less likely to have changes. This further reduces wasted time by avoiding an auto-program on signals that most likely do not have changes.

Some prior televisions were capable of running an auto-program that searched through all received signals to identify all of the potential channels on which broadcast information is being received. The television records the identified channel into a channel map. The channel map limits the channels that the television automatically accesses so that a user does not have to pass through those channels that do not have broadcast information. Thus, a user does not waste time trying to tune in a channel that does not have active broadcast information.

In performing an auto-program, it typically takes previous televisions a second or two to tune in and analyze each potential channel in determining if information is currently being broadcasted over the channel, and to record the channel. Because a typical terrestrial analog signal can carry approximately 69 or so channels, it typically take a television two minutes or more to complete the auto-program of just the terrestrial analog signal. The user is unable to watch any of the channels while the television is performing this auto-program.

With the advent of analog cable, digital terrestrial signals and digital cable, the number of channels available to a television has dramatically increased. For example, with analog cable, there are approximately 125 available channels. Performing the auto-program thus takes approximately twice as long or longer. Further, some signals, such as digital terrestrial signals, can be more difficult and/or time consuming to acquire. This can be caused by the number of multi-paths, antenna type, signal strength, dynamic multi-paths and other similar affects. The increased complexity in acquiring these signals requires further time to the generation of the channel map. Still further, televisions are configured such that when an auto-program is initiated, the auto-program attempts to generate a channel map for all available channels on all available signals from all available inputs. This can result in excessive amounts of time to generate the complete channel map, and often is unnecessary because some signals do not change very often.

In many systems today, a television is attached to a set-to-box or other device provided by a cable signal provider. The set-to-box receives and decodes the cable signals from the cable provider. Further, it is common for the cable provider to alter and change the allocation of the channels. For example, on one day a specific channel (e.g., 37) can be assigned to certain broadcaster (e.g., ESPN). On a following day, the cable provider may change the channel allocation such that the certain broadcaster (ESPN) is now assigned to a different channel (e.g., 36 or 122), to a sub-channel, or to a different sub-channel. It is not uncommon for cable providers to reallocate channel assignments weekly or even daily.

The reallocation of channels is often preformed transparently to the user. Cable providers allocate proprietary channels that are used to communicate control information (e.g., channel and sub-channel assignments, navigational information, commands, program frequency assignment information and other such information). The cable provider's set-top-box receives the proprietary information and adjusts the channels as dictated by the control information prior to supplying the signals to the television. As such, when the user attempts to access a desired broadcaster, the television receives the signal compensated by the set-top-box so that the television accurately tunes and supplies the desired broadcast information and/or programming. Therefore, the numbers of the channels in some implementations would not change as far as the user was concerned, any changes made by the cable provider would be picked up and transparently adjusted by the set-top-box.

One example of this proprietary control information is seen in digital cable. Often digital cable providers define a proprietary signal that allows the cable provider to supply information assigning broadcasted information to channels. The cable provider can supply this information at any time. In some instances the digital cable box maintains at least a portion of the box powered on and active to receive and decode the proprietary control information. This allows the cable box to receive the proprietary information and update channel assignments to better maintain the most current channel assignment information through the cable box.

Non-proprietary devices, such as digital televisions and other such non-proprietary devices capable of receiving cable signals and/or terrestrial signals, typically cannot accurately decrypt and/or decode the cable providers' proprietary information. As a result, non-proprietary devices are limited to simply displaying broadcasters in the channels allocated by the cable providers, which no longer correlates with the channel map that was previously generated, and can be confusing and frustrating to a user. The non-proprietary device must re-run the full auto-program to regenerate an updated channel map. As discussed above, the running of a complete and/or full auto-program generally requires the processing and analyzing of all of the channels for all of the signals received over all of the inputs which can take an undesirably long period of time.

Additionally as discussed above, it is not uncommon for cable providers to frequency alter or reallocate channel assignments. For example, a cable provider might reallocate channel assignments at least once a weekly or even once a day. As such, full auto-programs have to be regularly performed by previous televisions. Having to run an auto-program is inconvenient and frustrating for users because of the amount of time it takes to perform the complete auto-program. Further, as the number of signals available increases, the time to perform a full auto-program also increases. This long and frequent auto-programming can become very frustrating to users.

In many systems, and through many signal providers (cable providers, terrestrial signal providers, and the like) it is not uncommon for multiple signals to be supplied to a television over a single input. For example, digital cable may carry an analog signal, a National Television Standards Committee (NTSC) signal, and a 64 and/or 256 quadrature amplitude modulation (QAM) signals. In some instances the digital cable may further supply a frequency shifted or translated terrestrial digital signal or signals. Further, the television may have more than one input that could receive additional signals. The additional inputs and signals results in longer time periods to perform a complete and full auto-program, that often have to be performed at frequent and regular intervals (e.g., once a week, once a day) adding to a users' frustration.

Alternatively, the present embodiments provide an auto-program apparatus and method that can not only perform a complete auto-program of all available channels determined from all available signals from all the inputs, but can additionally provide an enhanced auto-program that can limit the performance of an auto-program to a single modulation scheme of a single signal from a single input. The enhanced auto-program searches for channels from a single modulation scheme in generating and/or updating a channel map. This allows an update of the channel map for a single modulation scheme and thus drastically reduces the amount of processing needed to update the channel map because only a limited number of channels from the channel map are reevaluated and/or reallocated within the channel map. The present embodiments reduce computational processing and processing time by limiting the auto-program to a single modulation scheme or to only a few modulation schemes.

Further, the present embodiments reduce and preferably avoid unnecessary processing and wasted time in the regeneration of the channel map by avoiding the re-evaluation of substantially stagnant modulation schemes because many of the modulation schemes received do not frequently change the channel allocation and/or assignments. Further, some embodiments further improve the channel evaluation process by specifically avoiding the evaluation of some defined modulation schemes. For example, the receiver can be instructed (e.g., by a user) not to tune in a particular modulation scheme and/or format. This instruction not to tune in a modulation format may be issued, for example, when the user knows that there are no signals modulated using Advanced Television System Committee (ATSC) formats on his/her cable system, and thus there is no need for the receiver to try and search that modulation format on that input.

In some embodiments, the enhanced auto-programming updates the channel map according to a modulation scheme currently being utilized by the television. Alternatively, the enhanced auto-program can be activated to search a specific modulation scheme. For example, a user can manually activate the enhanced auto-programming and select one or more of the specific modulation schemes to evaluate. Similarly, a controller within the television can periodically and/or randomly activate the enhanced auto-programming. The controller can be preprogrammed with information about the incoming signals and modulations schemes as well as an expected rate of change or reallocation of the channels for modulation schemes. With this expected rate of change the controller directs the enhanced auto-programming to one or more modulation schemes to maintain a current and accurate channel map. Further, the controller can receive information from remote suppliers directing the controller to initiate auto-programs of one or more signals, or can provide further or updated information about expected rates of change.

Controller activation of the enhanced auto-programming can be initiated when the television is initially turned on. Alternatively and/or additionally, the controller activation of the enhanced auto-programming can be initiated while the television is not in use, for example, in the middle of the night, so that the user does not have to wait for the updated or regenerated channel map. The updating and/or regeneration of the channel map can also be performed with reduced power because the full television set does not have to be powered on.

Further, because signal channel numbers (such as clear QAM channel numbers) may freely change, it may be less important to the viewer to list the channels via their physical channel number. Some present embodiments utilize channel identification information contained in the channel, if available, to create a unique identifier for the channel, which is often more beneficial to the user. The identifier can be a simple channel name, such as "CNN", or it might be more complex, such as using a transport identification number.

FIG. 1 depicts a simplified block diagram of an apparatus 110 for use in generating and/or updating a channel map according to some embodiments of the present invention. The apparatus has a plurality of inputs 112-114. Each input can supply one or more broadcast signals to the apparatus. The inputs couple with an identifying module 116. The identifying module receives the input signals and identifies one or more individual modulation schemes communicated through each of the one or more signals of the inputs 112-114. For example, one input 112 can be a cable input receiving digital and/or analog signals, such as a first signal modulated with 64-QAM and a second signal modulated with NTSC, the second input 113 can be configured to receive an NTSC modulated digital terrestrial signal, and the third input 114 can receive an analog UHF and/or VHF signal. In some embodiments, one or more of the inputs can couple with a network, such as the Internet, an intranet or other similar network to receive signals from other devices on the network. The identifying module 116 can identify each of the modulation schemes from each of the signals received over the inputs 112-114.

A selector device 120 is coupled with the identifying device 116. The selector device selects one of the signals and one of the modulation schemes from the selected signals. The selector additionally couples with a controller 122. The controller provides instructions to the selector dictating the signal and/or modulation scheme to be selected. The controller can determine the signal and modulation scheme based on an input 124, such as a manual input from a user. Alternatively and/or additionally, the controller can specify a modulation scheme based on predefined parameters, scheduling and/or present conditions of the apparatus 110, input signals 112-114 and/or channel map. The controller 122 can additionally couple with a memory 126 to access the predefined parameters, conditions and channel map.

An analyzing device 130 couples with the selector 120, and searches the selected modulation scheme. The analyzer 130 searches each potential channel assigned to the modulation scheme to identify channels upon which information is being broadcasted and channels that are currently inactive, not carrying information, cannot be descrambled, and/or have inadequate signal quality. In searching each potential channel, the analyzer 130 can couple with the memory 126 to receive a list of potential channels for the selected modulation scheme, or the analyzer can locally store lists of potential channels and/or search through a frequency band for signals with reception levels that exceed predefined thresholds. The analyzer detects channels of the selected modulation scheme carrying broadcast information and records those channels in a channel map, typically stored in the memory 126. The analyzer can further incorporate in the channel map an identifier or flag indicating the modulation scheme associated with each channel.

In some embodiments, the apparatus 110 further includes a video and/or audio processor that receives broadcast data delivered over a channel selected by a user, and processes the broadcast data to generate a display signal and/or audio signal. A display 140 and audio generator 142 can be included to receive the display signal and audio signal, respectively. The display produces a display output that can be viewed by a user and the audio generator can generate an audio output that can be heard by the user.

A wireless detector 144 can be included in some embodiments. The wireless detector can receive wireless control communications from a remote control operated by a user. The wireless detector can forward control commands to the controller directing control over the apparatus 110. Similarly, a manual apparatus control 146 can be included to receive manual controls from a user. One or more buses 150 can be included to allow coupling and communication between the controller and the components of the apparatus. Alternatively and/or additionally, direct coupling can be utilized. The controller 122 can be implemented through substantially and processor, microprocessor, computer, other devices providing computational processing and/or combinations thereof.

Figure 2A:
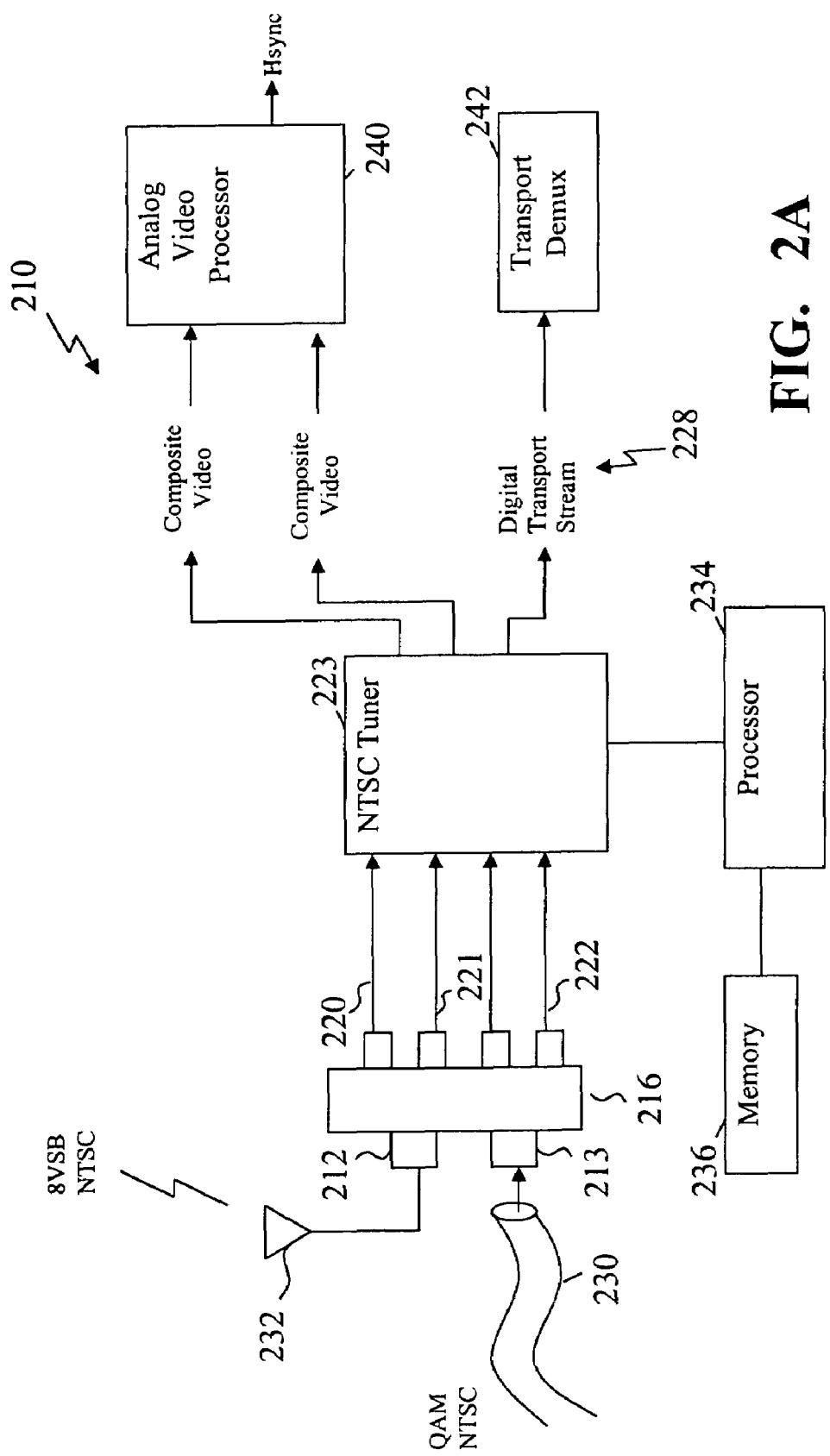
FIG. 2A depicts a simplified block diagram of an apparatus for use in generating and/or updating a channel map according to one embodiment.

FIG. 2A depicts a simplified block diagram of an apparatus 210 for use in generating and/or updating a channel map according to one embodiment. The apparatus includes a plurality of inputs 212-213. The inputs couple with a switch, router or splitter 216 that separates the one or more signals received over each of the plurality of inputs. For example, the switch 216 can identify and separate the signals based on modulation schemes of the plurality of signals. The separated signals 220-222 are forward to a tuner 223 that is capable of receiving, decoding and tuning in both analog and digital signals.

Figure 2B:
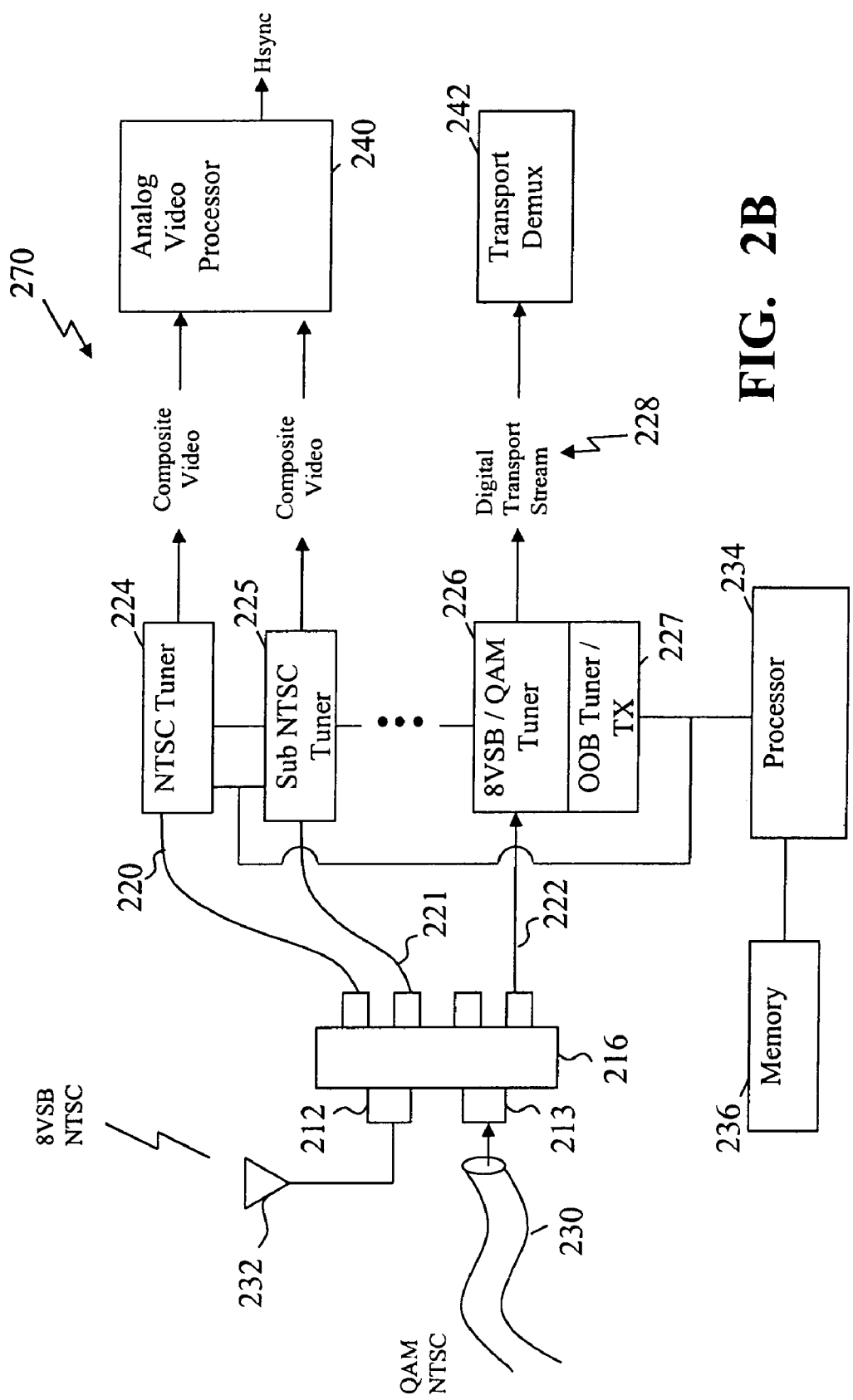
FIG. 2B depicts a simplified block diagram of an apparatus for use in generating and/or updating a channel map similar to the apparatus of FIG. 2A but employing a plurality of tuners.

In some embodiments, the apparatus can include any number of tuners for any number of modulation schemes. FIG. 2B depicts a simplified block diagram of an apparatus 270 employing a plurality of tuners 224-227 for use in generating and/or updating a channel map according to some embodiments. The separated signals 220-222 are forward to tuners 224-227. Each tuner can receive one or more signals 220-222 and provide defined tuning for the received signal or signals.

For example, a first input can be a cable 230 for receiving a cable television input that carries a first signal modulated according to NTSC and a second signal modulated utilizing 256-QAM and/or 8VSB. The second input can be coupled with one or more terrestrial receivers and/or antennas 232 that receive a third signal modulated according to NTSB and/or 8VSB. The separated signals 220-222 are forwarded to the appropriate tuner 224-227. For example, the apparatus can include a first tuner 224 that receives and tunes the NTSC signals. A second tuner 225 can be a sub-NTSC tuner. The third tuner can receive QAM and/or 8VSB signals while the fourth tuner can be an out of band (OOB) tuner.

Referring to FIGS. 2A-2B, the tuned signals 228 are forwarded to a video processor 240 and/or transport demultiplexer 242 for further processing prior to being forwarded to a display according to the channel selected by a user. In some embodiments, the tuner(s) additionally include one or more demodulators that demodulate the signals. Alternatively and/or additionally, the apparatus 210 (and/or 270) can include one or more separate demodulators that couple with the tuner(s) to demodulate the signals. In some embodiments, demodulators are incorporated into the video processor 240, the transport demultiplexer 242, and/or a processor and/or controller 234.

The processor 234 couples with the tuner(s), such that the processor receives the tuned signals. The processor can be implemented through a microprocessor, a computer, a server, a combination of servers and/or processors, and other similar processors and/or controllers. The signals received by the processor are analyzed and/or searched by the processor to detect and/or identify channels that carry broadcast information. The identified channels are forwarded to a memory 236, such as a non-volatile memory, to be stored as part of a channel map stored within the memory.

In operation the processor 234 can initiate a full channel map generation, an updated channel map operation, a limited channel mapping, and/or a channel addition operation. The initiation of one or more of these operations can be based on a user input (e.g., a user requests a full search and new channel map generation), based on received signal (e.g., one or more of the received signals can indicate changes that triggers the processor and/or controller 234 to initiate an update and/or limited mapping), based on predefined programming (e.g., the controller initiates an update and/or limited channel mapping once every 48 hours and/or randomly) and other similar initiations.

The processor and/or controller 234 can additionally initiate a scan of one or more signals and compare the received channels having broadcast information with the channel map stored in memory 236. During the scan, if a difference is detected between the received signals and the channel map, the controller can initiate an update of the channel map for just the modulation scheme with differences detected. The scan can be performed periodically, randomly or based on other criteria.

The channel map according to the present embodiments can be maintained and/or updated in many different formats and variations. In some embodiments, a single channel map is generated and maintained to retain the current channel mapping for all inputs and all modulation schemes. This single map can contain the channel numbers and channel name if available. A single map configuration may be employed, for example, when a system is implemented with a single controller that does the tuning. Further, the map can include indications of whether a channel is analog or digital, and is some instances a type of digital channel.

Some alternative embodiments can utilize a plurality of channel maps. In some instances the plurality of maps can be interlinked allowing each channel map to be aware of the fact that a channel may already be occupied in another modulation format. The utilization of one or more maps can simplify the generation of and maintenance of the mapping. The use of a plurality of maps can be employed in a system with a single controller that allocates channel assignments to the plurality of maps, and/or in systems that utilize a plurality of controllers, which might be independent of the each other. Further, multiple copies of channel maps may be utilized, where the multiple copies are synchronized at regular intervals and/or synchronized when a change is detected.

Figure 3:
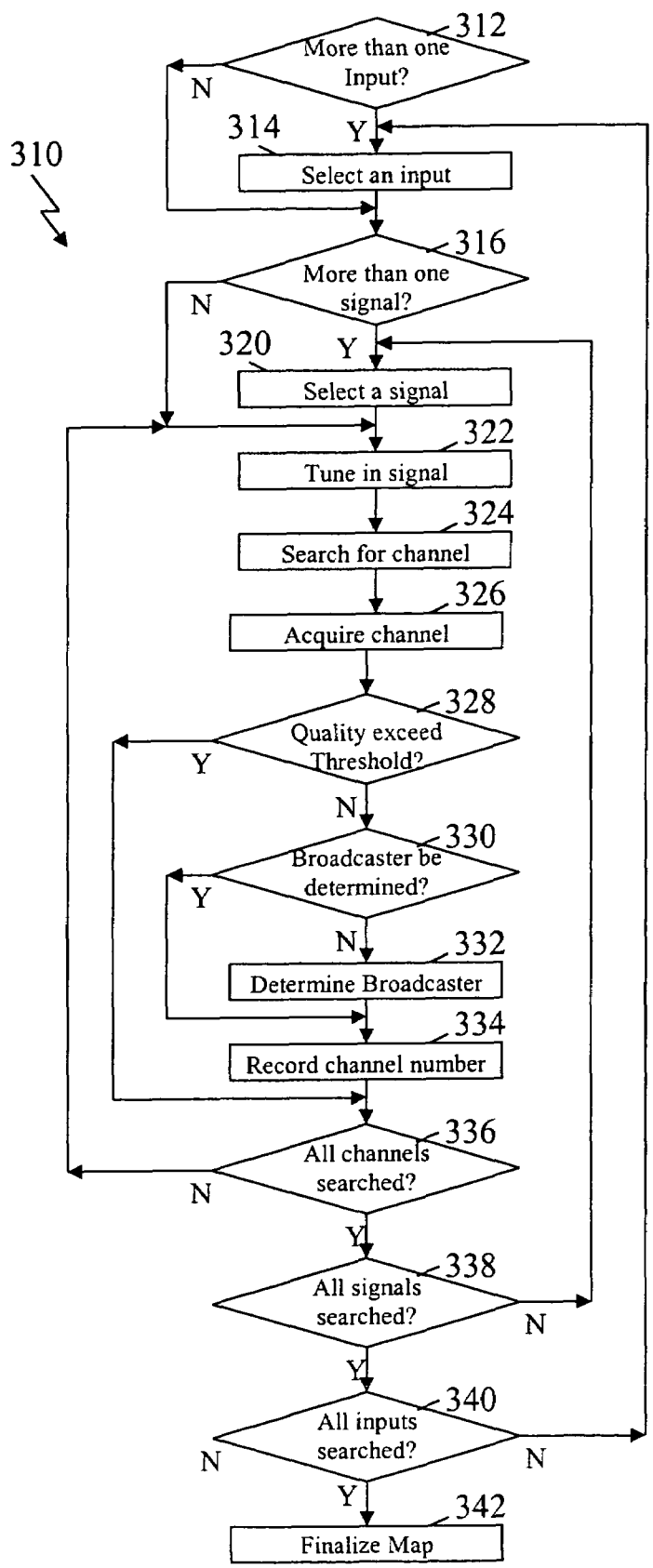
FIG. 3 depicts a simplified flow diagram of a process for use in performing an auto-program to generate and/or update a channel map.

FIG. 3 depicts a simplified flow diagram of a process 310 for use in performing an auto-program to generate and/or update a channel map according to some embodiments. In step 312, it is determined if more than one input is received and/or needs to be evaluated. If there is not more than one input the process skips to step 316. If there is more than one input, one of the inputs that has not already been evaluated during the current channel mapping is selected to be analyzed. In step 316, it is determined if the selected input has more than one signal being delivered. Typically, this is determined by detecting a plurality of modulation schemes on the selected input. If there is only one signal on the input, the process skips to step 322. If there is more than one signal, step 320 is entered where one of the signals that has not yet been evaluated during the current channel mapping is selected to be analyzed. The selected signal can be determined based on a modulation scheme. For example, the auto-program can select to perform a channel search on a terrestrial input. A terrestrial input can, however, carry more than one signal. As such, one of the signals, such as an analog NTSC signal can be selected and the modulation for the analog NTSC can be used to detect channels on the signal carrying retrievable programming.

In step 322, the selected signal of the selected input is tuned in. In step 324, a search for one or more channels is initiated. In step 326, the process detects when a channel is acquired that carries broadcast information. In step 328, it is determined if the signal quality of the broadcast information exceeds a threshold level to ensure the user can accurately view the received and tuned channel. If the quality does not exceed the threshold, the process skips to step 336. Alternatively, if the signal quality exceeds the threshold, step 330 is entered where it is determined if a broadcaster and/or channel name can be determined. If the broadcaster and/or channel name cannot be determined, the process proceeds to step 334.

If the broadcaster and/or channel name can be determined, step 332 is entered where the broadcaster and/or channel name are retrieved. In step 334, the channel (and broadcaster/channel name if available) is recorded into the channel map. In some embodiments, the channel map is stored in a memory following each channel determination. As such, if an interruption occurs the channel mapping can be reinitiated in the future from the point where the auto-program left off.

In step 336, it is determined if the full frequency band and/or all of the potential channels carried by the selected signal have been analyzed. If it is determined that not all of the channels have been analyzed, the process 310 returns to step 324 to continue to search for the next channel. If all of the channels have been analyzed for the selected signal, the process continues to step 338 where it is determined if each of the signals received over the selected input have been evaluated. If all of the signals have not been evaluated, the process returns to step 320 to select another signal to evaluate.

If it is determined that all of the signals have been evaluated, the process proceeds to step 340 where it is determined if all of the inputs have been evaluated. If all of the inputs have not been evaluated, the process 310 returns to step 314. If all of the inputs have been evaluated, step 342 is entered where the channel map is finalized and made available to the television and/or user.

Again, FIG. 3 shows a process for performing a full auto-program. The full auto-program generates and/or updates a channel map based typically on all available inputs and all available signals on each available input. Performing a full auto-program each time the channel map is to be updated, however, can be a slow and long process. The present embodiments additionally provide a signal and/or modulation scheme auto-program where the updating and/or generating of the channel map can be limited to a single signal and/or modulation scheme.

As discussed above, a signal is typically communicated to the television through a single modulation scheme. The present embodiments can perform a single signal or single modulation scheme auto-program based on substantially any modulation scheme, such as analog NTSC, QAM, 8VSB, and substantially any other modulation scheme.

Figure 4:
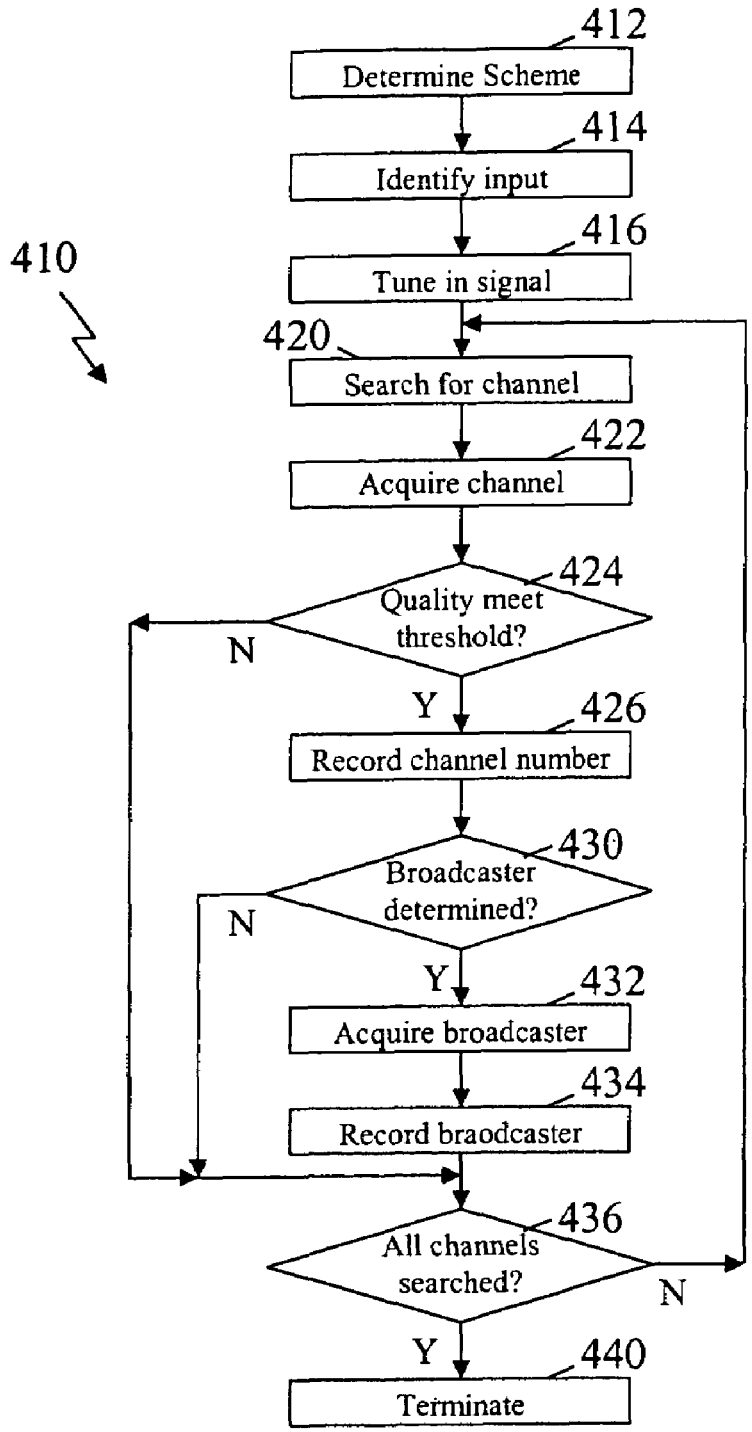
FIG. 4 depicts a simplified flow diagram of a process for performing a single signal auto-program according to some embodiments.

FIG. 4 depicts a simplified flow diagram of a process 410 for performing a single signal auto-program according to some embodiments. The single signal auto-program can be initiated through and/or by several different events. For example, the single signal auto-program can be manually initiated by a user. Alternatively, the auto-program can be initiated by a scan of available channels that verifies the accuracy of the channel map. A channel scan is described fully below with reference to FIG. 5. In some embodiments, the single signal auto-program can be initiated based on a predefined schedule, such as once a week, once a day or other schedule depending on the expected and/or measured rate of change. The scheduling can be predefined (based on expected rates of change), can be periodically updated (e.g., through an internet connection, dial up connection, wireless connection or other connections), can be updated based on measured rates of change (e.g., some embodiments can monitor the changes detected during previous single signal auto-programs and/or channel mapping scans (described below) and other measurements), combination thereof, and other scheduling. The single signal, modulation scheme auto-program allows present embodiments to limit signal and/or input evaluations to those signals and/or inputs likely to have changes, and thus maintaining accurate channel maps in reduced processing time.

In step 412, a signal and/or modulation scheme is selected and/or determined to be evaluated. The signal can be selected based on a modulation scheme currently being viewed by the user, manually selected by the user, selected by a channel scan, selected as a scheduled up-date, and other similar selection methods. Indicating the signal to be evaluated can further speed up the auto-programming process because the programming process does not have to spend time determining which signal to evaluate. In some embodiments, the selection can also take into consideration which signals typically require less time and/or less processing. As such, the quicker mapping can be performed first followed by the more complex and/or longer processing, if more than one signal is to be evaluated. Additionally, some modulation types can be ignored for certain types of inputs. For example, the QAM modulation format is typically not broadcasted terrestrially. As such, the system can be instructed, by the user or through previous instructions, that the terrestrial inputs are not to be evaluated for QAM modulation.

Instructions can be defined for substantially any input and substantially any modulation scheme. For example, if a first input (input A) is connected with a terrestrial antenna the system can be instructed not to check for QAM modulated signals. If a second input (input B) is connected to a cable television feed, typically the feed will contain signals modulated with NTSC and/or QAM. It is also possible that the second input will receive 8 VSB signals, however this is less common. As such, the system can be instructed to evaluate the NTSC and/or QAM signals, and once those are complete evaluate the 8 VSB signal(s).

Still referring to FIG. 4, in step 414, the input selected and an associated modulation scheme are identified. For example, a user can be watching a program delivered via a cable on a signal modulated with analog NTSC, and the user can manually request a single signal auto-program (through a remote control, through an on-screen menu or through other similar selections). Step 414 identifies that a modulation scheme auto-program channel mapping is to be performed on the NTSC modulated signal received over the cable input.

In step 416, the selected modulation scheme is tuned in to receive the selected signal, if the signal is not already being tuned in. In step 420, a channel search is initiated over the predefined channel bandwidth of the selected modulation scheme. In step 422, a channel is acquired through the tuning. In step 424, it is determined if the signal quality of the acquired channel at least meets a threshold level of quality. For example, a signal-to-noise ratio, a frame error rate, a signal amplitude and other similar factors or combination of factors can be used to determine a channel quality.

If it is determined that the channel quality does not meet the threshold, the process 410 proceeds to step 436 to determine if further channels are to be evaluated. Alternatively, if it is determined that the channel quality meets the threshold, step 426 is entered where the channel is written and/or recorded into the channel map. In step 430, the process determines if a broadcaster and/or channel name (e.g., ESPN, CBS, ABC, HBO, etc.) can be determined. If the broadcaster and/or channel name can be determined, step 432 is entered where the broadcaster and/or channel names are retrieved. In step 434, the broadcaster and/or channel names are recorded into the channel map and associated with the channel number recorded in step 426.

Following step 434 and 424 (if the signal quality does not meet the threshold), the process continues to step 436 where it is determined if all of the channels have been evaluated. In some embodiments, the frequency bandwidth is evaluated to determine if the full bandwidth has been evaluated for channels. Alternatively and/or additionally, a predefined potential channel list is accessed. Other criteria can be evaluated to ensure that the signal is fully analyzed within the capability of the television or other apparatus performing the modulation scheme auto-program process 410. If it is determined that not all of the channels have been evaluated, the process returns to step 420 in an attempt to acquire further channels. If all of the channels for the selected modulation scheme have been evaluated, the process terminates the auto-program in step 440 and stores at least the channel map for the selected signal. In some embodiments, the channel map is stored at steps 426 and/or 434 in case of an interruption, power failure or other problem so that the channel mapping is at least updated for the data acquired and/or to allow the modulation scheme auto-program to be started from the point of interruption in the future.

Figure 5:
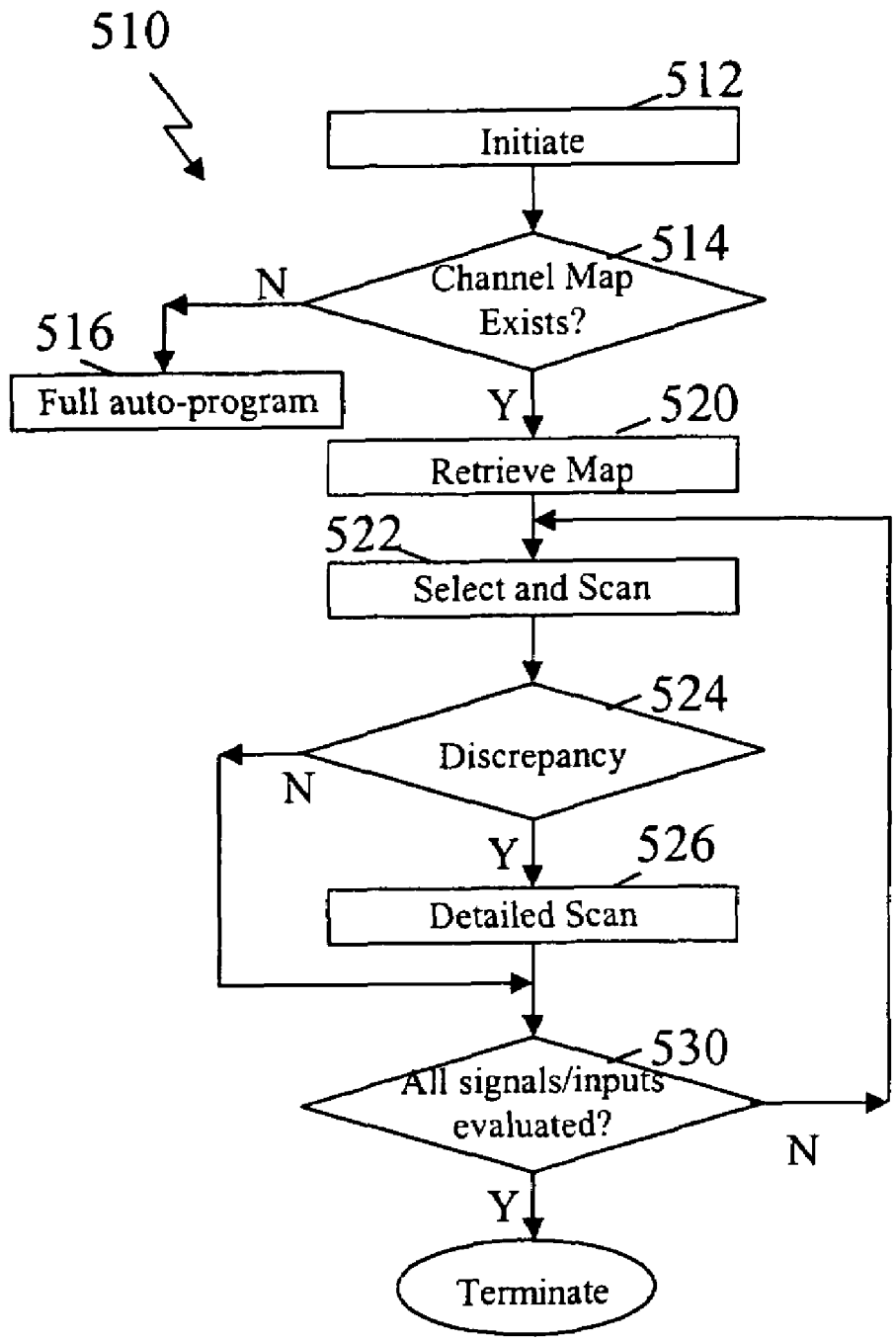
FIG. 5 depicts a simplified flow diagram of a process for performing a channel scan according to some embodiments.

FIG. 5 depicts a simplified flow diagram of a process 510 for performing a channel scan according to some embodiments. The channel scan provides for a rapid scan of one or more inputs and/or one or more signals to, at least in part, verify that one or more channel maps are accurate and up to date. The scan can be performed for all possible inputs and signals or can be limited to specific inputs and/or signals. For example, the channel scan process 510 can be scheduled to perform a scan of a first signal every day, to perform a scan of a second signal every other day, and to perform a full scan of all possible inputs and channels once a week. It will be apparent to one skilled in the art that other scanning strategies can be employed without departing from the inventive aspects of the present embodiments.

The channel scan can be initiated when the television is off or not being used. The channel scan can be scheduled to be activated, for example, in the middle of the night when most televisions are not in use. Additionally, the channel scan can be rescheduled if it is detected that the television is currently in use. Alternatively and/or additionally, the channel scan can be initiated once the television is turned off. Thus, the monitor, audio and other components of the television are powered down, while the tuning circuitry, scanning processor and/or other auto-program processors remain powered or are powered up as needed to implement the scan and auto-programming according to the defined processes. In other embodiments, a channel scan can be performed on one input or just on one signal, while the other signals of the input and the other inputs are still available for viewing.

In step 512, the channel scan is initiated. The scan can be initiated through any number of methods, such as manually initiated (by a user, remotely by a broadcaster, remotely by a television manufacturer, remotely by a signal provider (e.g., cable company and/or terrestrial signal provider)), periodically scheduled (e.g., once a day, every other day, once a week, and other similar scheduling), randomly initiated, and other similar initiations. In step 514, it is determined if one or more channel maps exist. If a channel map does not exist, step 516 is entered where the channel scan is halted and a full auto-program is initiated, such as the full auto-program process 310 of FIG. 3.

If a channel map exists, one or more of the channel maps are retrieved in step 520. In step 522, an input and a signal are selected, and a scan of the input signal is performed. In step 524, it is determined if there is a discrepancy between the currently received signal and the channel map. A discrepancy can be a change in the channel line up, for example, a new channel is detected, an existing channel no longer exists, an existing channel has a different or changed transport identification, and/or other identifying traits are different. If there are no discrepancies, the process continues to step 530. If a discrepancy is detected, the process continues to step 526 where a more detailed scan is performed.

For example, an auto-program can be initiated for at least the signal or the modulation scheme, such as the auto-program 310 of FIG. 3 limited to the single signal or input.

In step 530, the process determines if all of the signals and/or inputs to be evaluated have been evaluated. Again, the evaluation of the signals and/or inputs can be based on schedules, random or other configurations. Alternatively, the evaluation can be a scan of all of the received signals. If it is determined that further signals and/or inputs are to be scanned, the process returns to step 522 to select the next signal and/or input to scan. If all of the signals to be scanned have been scanned, the process terminates.

Figure 6:
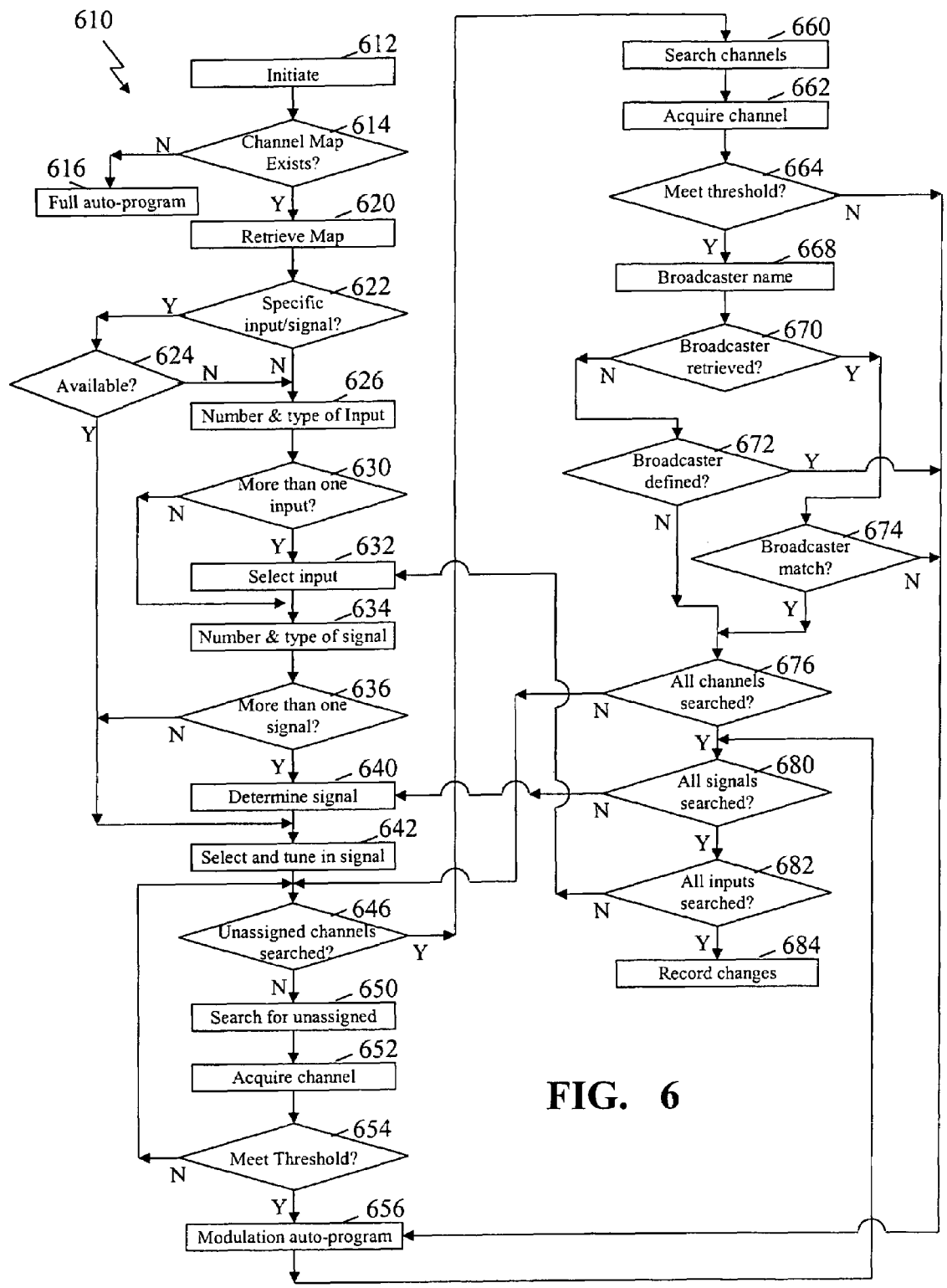
FIG. 6 depicts a simplified flow diagram of a process for performing a channel scan according to some embodiments.

FIG. 6 depicts a simplified flow diagram of a process 610 for performing a channel scan according to some embodiments. Again, the channel scan can at least provide a scan of one or more inputs and/or one or more signals to, at least in part, verify that the channel map is accurate and/or to up-date the map.

In step 612, the channel scan is initiated. The scan can be initiated through any number of methods, such as manually initiated (by a user, remotely by a broadcaster, remotely by a television manufacturer, remotely by a signal provider (e.g., cable company and/or terrestrial signal provider)), periodically scheduled (e.g., once a day, every other day, once a week, and other similar scheduling), randomly initiated, and other similar initiations. In step 614, it is determined if a channel map exists. If a channel map does not exist, step 616 is entered where the channel scan is halted and a full auto-program is initiated, such as the full auto-program process 310 of FIG. 3.

If a channel map exists, the channel map is retrieved in step 620. In step 622, it is determined if a signal has been pre-selected or indicated (e.g., due to scheduling, manual selection and the like). If the signal has been pre-selected, step 624 is entered where it is determined if the selected signal is being received and/or available to be evaluated. If the signal is available, the process 610 proceeds to step 642. If it is determined in step 622 that a specific input is not selected, and/or if it is determined that the selected signal is not available in step 624, the process continues to step 626.

In step 626, the number and type of inputs are determined. In step 630, it is determined if there is more than one input. If there is not more than one input, the process proceeds to step 634. If there is more than one input, step 632 is entered where one of the inputs not yet scanned is selected for evaluation. The process keeps track of inputs previously selection during a current scan to avoid rescanning. In some embodiments, the selection can further be based on pre-defined parameters and/or conditions, on previous scans (e.g., selecting an input that has not recently been scanned), on predefined schedules, on which input is more likely to have changes, and other similar criteria. Determining the signals more likely to have changes can be based on previous scan statistics that are maintained by the process 610, predefined parameters, notification by broadcasters and/or signal providers and other similar methods of determination.

In step 634, the number, type and/or modulation scheme of signals received over the selected input are identified. In step 636, it is determined if there is more than one signal delivered by the selected input. If there is only one signal, the process 610 proceeds to step 642. Alternatively, if there is more than one signal step 640 is entered where a signal is selected from the plurality of signals. The selection determines which signals have already been scanned during the current channel scan. Further, the selection can be based on any number of criteria, conditions and/or parameters, as well as on previous scans (e.g., selecting a signal that has not recently been scanned), on predefined schedules, on which signal is more likely to have changes, and other similar criteria. Again, determining the signals more likely to have changes can be based on previous scan statistics, predefined parameters, notification by broadcasters and/or signal providers and other similar methods of determination. In step 642, the selected signal is tuned in.

In step 646, it is determined if all the unassigned channels that are defined in an existing channel map of not delivering broadcast information (with sufficient signal quality) have been scanned and evaluated. If all of the unassigned channels have not been searched, step 650 is entered where a next unassigned channel is determined. In step 652, the determined next unassigned channel is acquired. In step 654, it is determined if a broadcast is received and if the signal quality meets predefined thresholds. If a broadcast is not detected and/or the signal quality does not meet the threshold, the process returns to step 646 to determine if all of the unassigned channels have been evaluated. In some embodiments, it is noted in the channel map that the channel remains unassigned.

If it is determined in step 654 that broadcast information is detected and the signal quality on the unassigned channel does exceed thresholds, a change in channel assignments is assumed and the process proceeds to step 656 where a modulation scheme auto-program is initiated for the selected signal, such as the modulation scheme auto-program of process 410 of FIG. 4. In some alternative embodiments, the newly detected channel is simply assigned and incorporated into the channel map. In preferred embodiments, however, it is assumed that the detected change indicates any number of changes in the channel line-up and the previous channel assignments is no longer accurate, at least for the signal being currently evaluated. This is because a previously assigned channel may be re-assigned to a different broadcaster, which would make the previously assigned channel mapping incorrect. For example, a previous mapping for channel 34 can be assigned for broadcasting HBO, while channel 36 can be assigned to CNN and channel 35 can be unassigned. The signal provider (e.g., cable company) may at any time reassign channel assignments, where HBO may be assigned to channel 35 (the previously unassigned channel) while CNN is reassigned to channel 34. Thus, channel 34 is still assigned, but no longer assigned to HBO.

Following step 656 and the completion of the modulation scheme auto-programming, the channel scan process 610 continues to step 680. If it is determined in step 646 that all of the unassigned channels have been evaluated, the process continues to step 660 where a search for assigned channels within the selected signal are evaluated. In step 662, a previously assigned channel is tuned in and acquired. In step 664, it is determined if the signal quality of the previously assigned channel at least meets a defined threshold level. If the signal quality does not meet the threshold the process 610 returns to step 656 to initiate a modulation scheme auto-program. If the signal quality meets the threshold, the process continues to step 668.

In some implementations of the process 610, and in some alternate embodiments, the evaluation of assigned channels can be excluded or skipped. As such, the channel scan detects changes to just the unassigned channels. Preferred embodiments, however, additionally perform a channel scan of assigned channels to verify the assignments of the channels and the accuracy of the channel map.

In step 668, the signal is analyzed in an attempt to determine a broadcaster and/or a channel name. In step 670, it is determined if the broadcaster and/or channel name can be extracted. If the broadcaster/channel name cannot be determined, the process continues to step 672 where it is determined if the broadcaster/channel name was previously defined in the channel map. If the broadcaster/channel name was previously defined, the process returns to step 656 where a modulation scheme auto-program is initiated.

If the broadcaster and/or channel name were retrieved, the process continues to step 674 where the retrieved broadcaster/channel name is compared with a previously stored broadcaster/channel name. If the previously stored broadcaster/channel name is different, or if a broadcaster/channel name was not previously recorded for the channel being evaluated, the process returns to step 656 to initiate a modulation scheme auto-program. If the broadcaster/channel name matches, the process continues to step 676 where it is determined if all of the channels of the signal have been evaluated. This can be achieved by comparing a list of expected channels, verifying a complete search of a frequency band and other similar techniques. If all of the channels have not been evaluated, the process 610 returns to step 646 to continue evaluating the remainder of the channels of the signal.

If it is determined in step 676 that all of the channels have been evaluated, the process continues to step 680 where it is determined if all of the signals for the selected input have been evaluated. In some embodiments, the channel scan can be limited to certain predefined signals of an input and certain inputs. As such, step 680 can determine if all of the signals that are scheduled to be evaluated have been evaluated. If all of the signals have not been evaluated, the process returns to step 640 where a subsequent signal is determined. If all of the signals have been evaluated, step 682 is entered where it is determined if all of the inputs have been evaluated or all of the scheduled inputs have been evaluated. If all of the inputs have not been evaluated, the process 610 returns to step 632 to select the next input.

If it is determined in step 682 that all of the inputs have been evaluated, step 684 is entered where the signals and/or input that were detected to include changes are recorded and statistics are maintained (e.g., how often a signal includes changes, how often an input includes changes, the channels that are detected to include changes, and other such statistics). As discussed above, these statistics can be used to determine which signals and/or input to evaluate, how often they should be evaluated and other similar actions. These statistics can also be recorded at any point during the process 610. The saving of the statistics does not have to be maintained until the final step. Additionally, the modulation scheme auto-program can be configured to maintain statistics if a channel map was previously generated. Further, the signals and/or inputs scanned can be recorded during the process 610 in case of a power interrupt, if the television is turned on for use or other events that may halt the channel scan. This allows the channel scan process 610 to continue from where it was halted.

The present embodiments provide methods and apparatuses for use in performing limited auto-programming of available channels received by a television. The limited auto-programming can be performed in a significantly reduced amount of time than a full auto-program. Because of the number of signals that can be received by a television, a full auto-program can take an excessively long period of time. This time period can inhibit users to initiate channel mapping and reduce the users' ability to access channels desired. The present embodiments can limit an auto-program to a single modulation scheme and/or signal, thereby reducing the total number of channels that have to be evaluated. Further, the embodiments can allow for auto-programs of signals that are more likely to change, while avoiding having to perform auto-programs on signals that are substantially static.

In some embodiments the system and/or television can allow a user to access television signals and/or external input signals (video, DVD and the like) while the scan and/or auto-program is in progress. Some embodiments can include multiple tuners. While one or more turners are performing an auto-program and/or scan, another one or more tuners are still available to allow the user to access channels supplied through those one or more tuners. In some embodiments, a user can set or define default channels, one for analog and one for digital (or one for each tuner) such that the one or more default channels are available during an auto-program when the associated tuner is not taking part in the auto-program. Similarly, one or more video and other external inputs can also be active during a scan and/or auto-program. In some embodiments, the television can display the progress of the scan and/or auto-program in a sub-picture window, while still allowing the user to view channels through tuners not active in the scan or auto-program and/or the external inputs.

While these embodiments have been described by means of specific embodiments and applications thereof, numerous modifications and variations could be made thereto by those skilled in the art without departing from the scope of the invention set forth in the claims.

What is claimed is:

1. A method for use in generating a television channel map, comprising:
   selecting a first input of a plurality of inputs where a plurality of signals are received on the first input;
   selecting a first single modulation scheme of a plurality modulation schemes on the first input and selecting a first signal modulated in accordance with the first signal modulation scheme of the plurality of signals received on the first input;
   tuning a plurality of channels for the first signal modulated in accordance with the single modulation scheme;
   determining if a broadcast is received on each of the channels;
   recording channels that are determined to receive broadcasts in a channel map according to the plurality of tuned channels for the identified single modulation scheme; and
   not performing a full auto-program such that the auto-program is limited to the first signal of the plurality of signals received on the first input.

2. The method of claim 1, wherein the not performing the full auto-program includes terminating an auto-program after evaluating only the first modulation scheme without completing an auto-program for any other modulation scheme.

3. The method of claim 2, further comprising:
   determining if the channel map includes an assignment for a first tuned channel;
   identifying a channel name associated with the first tuned channel; and
   replacing the assignment with the first tuned channel and recording the channel and the channel name in the channel map.

4. The method of claim 1, further comprising:
   scanning a signal modulated by the first modulation scheme;

identifying channels carrying broadcast information;
comparing previously defined channel assignments of the channel map with the identified channels during the scanning; and
initiating the tuning, the determining and the recording when a difference is detected during the comparing the channel assignments.

5. The method of claim 1, further comprising:
scanning a signal of the single modulation scheme;
comparing channel assignments of the channel map with identified channels during the scanning; and
initiating the tuning and the recording for the single modulation scheme when a difference is detected during the comparing the channel assignments.

6. The method of claim 5, further comprising:
identifying a broadcaster associated with at least a first channel of the identified channels, and wherein the comparing comprises comparing the broadcaster of the first channel with the channel assignments of the channel map; and
initiating the tuning and the recording for the single modulation scheme when a difference is detected with the identified broadcaster.

7. The method of claim 1, further comprising:
identifying channels not assigned in the channel map associated with the modulation scheme;
scanning a signal of the single modulation scheme for a first channel of the identified channels not assigned in the channel map;
determining if a first broadcast is received over the first channel; and
initiating the tuning and the recording for the single modulation scheme when the first broadcast is received over the first channel.

8. The method of claim 7, further comprising:
determining if any broadcast is received on each of the identified channels not assigned in the channel map; and
initiating the tuning and the recording for the single modulation scheme when a broadcast is received over one of the identified channels not assigned.

9. A method for use in generating a channel map, comprising:
selecting a first input of a plurality of inputs where a plurality of signals are received on the first input;
selecting a first signal of the plurality of signals to evaluate;
generating a channel map for the first signal, comprising:
tuning in the first signal;
tuning in each of a plurality of channels carried by the first signal; and
recording into the channel map each of a plurality of channels that deliver broadcast information; and
limiting the channel map to the first signal of the plurality of signals received on the first input and not performing a full auto-program.

10. The method of claim 9, wherein the limiting further comprises limiting the channel map to the first signal and not generating channel map for other signals of the plurality of signals.

11. The method of claim 9, further comprising:
determining if a signal quality meets a predefined threshold for each of the plurality of channels that deliver broadcast information prior to recording, wherein the recording comprises recording each of the plurality of channels that have a signal quality that meet the predefined threshold into the channel.

12. The method of claim 9, further comprising:
determining if a channel map exists for the selected first signal;
tuning in a first channel that is not recorded in the channel map when a channel map exists;
determining if a signal quality for the tuned in channel meets a predefined threshold; and
initiating the generating of the channel map for the entire selected first signal when the signal quality of the tuned in channel that was not previously recorded in the channel map meets the predefined threshold.

13. The method of claim 12, further comprising:
determining a broadcaster of a second channel that has previously been recorded in the channel map;
comparing the determined broadcaster with a recorded broadcaster previously recorded in the channel map;
determining if the determined broadcaster is different than the recorded broadcaster; and
initiating the generating of the channel map for the entire selected first signal when the determined broadcaster is different than the recorded broadcaster.

14. The method of claim 12, further comprising:
performing the generating of the channel map for the entire selected first signal comprising:
tuning in each of a plurality of channels carried by the first signal modulated with a selected modulation scheme;
determining which of the plurality of channels have a signal quality that meets the threshold when tuned in; and
recording each channel of the plurality of channels that have the signal quality that meets the threshold in to the channel map.

15. The method of claim 14, further comprising:
determining a broadcaster for at least one of the plurality of channels that have the signal quality that meets the threshold when tuned in; and
recording the broadcaster in the channel map and associating the broadcaster with the recorded channel.

16. An apparatus for use in generating a channel map, comprising:
a plurality of inputs that each receive at least one signal;
a selecting device coupled with each of the plurality of inputs, wherein the selecting device selects a first signal from a plurality of signals from one of the plurality of inputs;
a tuner coupled with the selecting device, wherein the tuner receives and tunes in the selected first signal;
a processor coupled with the tuner, wherein the processor receives the first signal and performs a channel mapping of the first signal while limiting the channel mapping to the first signal and not completing a full channel mapping of the other signals received through the plurality of inputs.

17. The apparatus of claim 16, further comprising:
a plurality of tuners coupled with the selecting device, each tuner tuning at least one of the plurality of signals.

18. The apparatus of claim 17, wherein at least a first tuner of the plurality of tuners is a quadrature amplitude modulation (QAM) tuner, and at least a second tuner of the plurality of tuners is a National Television Standards Committee (NTSC) tuner.

19. The apparatus of claim 16, further comprising:
a video processor coupled with the tuner, wherein the video processor processes the signal to generate a video output to be displayed; and
a memory coupled with the processor, wherein the memory stores the channel map.

* * * * *